April 25, 1967     W. C. DERSCH     3,316,353
LISP METER
Filed Aug. 5, 1963            2 Sheets-Sheet 1
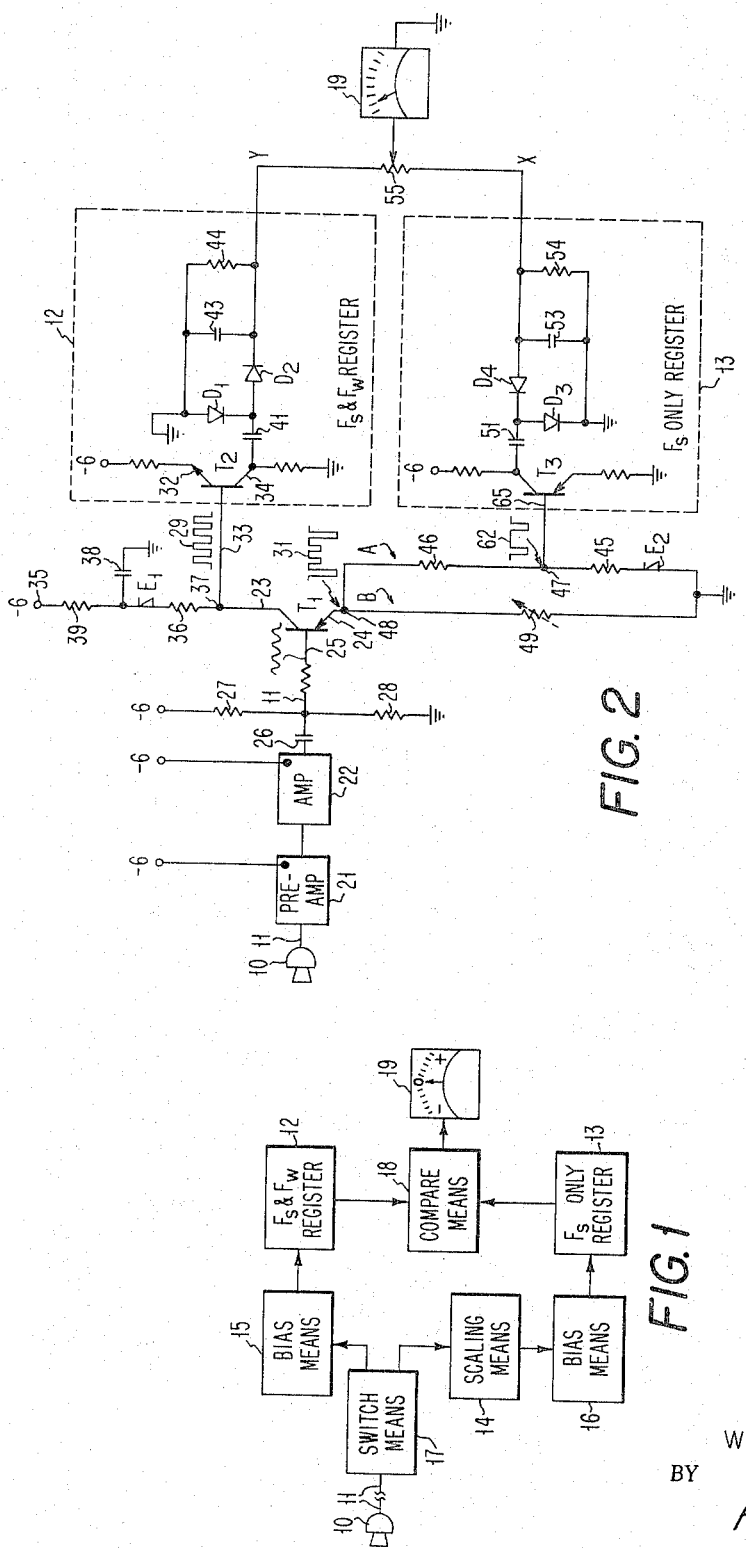
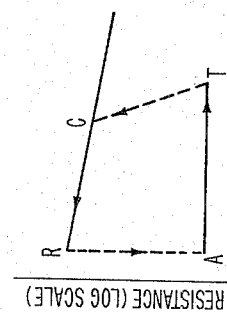
FIG. 4
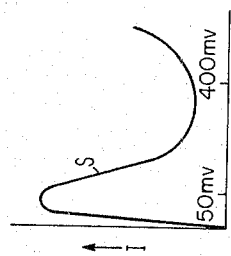
FIG. 3
INVENTOR.
WILLIAM C. DERSCH
BY
*Flehr & Swain*
ATTORNEYS April 25, 1967  W. C. DERSCH  3,316,353
LISP METER Filed Aug. 5, 1963　　　　　　　　　　　　　　　2 Sheets-Sheet 2

INVENTOR.
WILLIAM C. DERSCH
BY
*Flehr & Swain*
ATTORNEYS

United States Patent Office 3,316,353
Patented Apr. 25, 1967

3,316,353
LISP METER
William C. Dersch, Los Gatos, Calif., assignor to Voice Systems, Inc., a corporation of California
Filed Aug. 5, 1963, Ser. No. 299,761
16 Claims. (Cl. 179—1)

This invention pertains to speech defect measuring and analyzing equipment. More particularly the invention pertains to a meter for measuring sibilant or "frictional" sounds, classified as "strong" or "weak" (respectively, "s," hard "t," and "x" or "f," "v," and soft "t"), and for comparing the extent of the presence of one to that of the other. The invention, therefore, pertains to a reliable lisp measurement device particularly useful in speech therapy and the like.

Equipment has previously existed for detecting weak and strong frictional sounds, $F_w$ and $F_s$, respectively. Frictional sounds result when the tongue, teeth or lips are formed into a construction through which air is passed. As mentioned above, frictional sounds have previously been further subdivided into "strong" and "weak."

For successful speech therapy practice, psychological factors cannot be ignored. Such therapy primarily concerns working with children and it is desirable to conduct testing under circumstances as free of apprehension and misgiving as possible, as in the familiar environment of the home or school and with equipment appearing as unforeboding as possible.

To this end, according to the present invention, a lisp meter is provided which is incorporated, for example, in a conventional household telephone hand set and stand. It is entirely self-contained and portable, operating simply from a small battery for exceedingly extended periods running into many hours and days.

The previous equipment adverted to above, and as will be more fully described below, requires at least a twenty volt supply and a biasing arrangement which causes a substantially continuous power drain of the supply. Accordingly, prior equipment does not lend itself to providing the highly desirable characteristics requisite to the most successful speech therapy practice.

By way of background, in the previous scheme noted, an acoustic wave is transduced and the zero power axis crossings of the resultant signal are detected. Strong frictioning is distinguished from weak frictioning on the basis of the difference in acoustic energy represented by the amplitude of the transduced signal. The axis crossing density of all frictional signals present in the transduced signal is summed and compared to the axis crossing density of the strong frictioning signals, only, in order to provide a ratio or difference indicative of the preponderance of $F_w$ or $F_s$.

A bi-level impedance means generates a pulse for each zero power axis crossing of the incoming signal, i.e., for both $F_w$ and $F_s$ signals. A second, higher trigger level impedance is provided in parallel with the aforementioned impedance for amplitude discrimination, i.e., for $F_s$ only. More particularly, amplitude differences are detected by feeding speech signals into parallel lines of Esaki (or tunnel) diodes so that the "transition current" level of one diode will respond to both weak and strong frictioning, while that of the other responds to strong frictioning only. In this manner, upon the incidence of weak frictioning only, an $F_w$ signal is switched through to the output. In the case of strong frictioning, both an $F_w$ and an $F_s$ signal are fed out. The difference in output signals provides discrimination by indicating a perponderance of one or the other.

In short, weak frictioning is separated from strong frictioning according to differences in the current level of the transduced wave. These levels are detected separately by separating the input signal and providing scaled differences in transition current applied to bi-stable, "square" hysteresis solid state devices (e.g., Esaki tunnel diodes) and bucking the output of the devices against each other.

A characteristic of the Esaki diode which is called into play in the foregoing scheme is its resistance-current "square" hysteresis loop whereby it may be "tripped" at different levels of current therethrough to exhibit different stable resistance values before and after "tripping." Therefore, it is considered to be a bi-stable impedance element.

Thus, one of the two parallel lines constitutes a low amplitude line and the other constitutes a high amplitude line. Means are employed for scaling "transition current" to the Esaki diodes as necessary so as to separately trip them at significantly different levels of the transduced wave input signal. The means for scaling the incoming signal for separating $F_s$ waves from $F_w$ waves has previously required the aforementioned twenty volt power supply.

While it is a general object of the present invention to provide improved equipment of the kind described, it is a more particular object of the invention to provide speech defect measuring and analyzing equipment wherein a relatively low power supply is sufficient for operation.

It is another object of the invention to provide speech defect measuring and analyzing equipment wherein the battery drain, during the quiescent time when no speech signal is present, is sufficiently low to be virtually negligible.

It is a still more particular object of the invention to provide a small compact portable lisp meter capable of extended efficient operation for many hours on the low voltage supply of a single conventional flashlight or portable radio battery.

These and other objects will be more clearly apparent from the following description of a preferred embodiment according to the invention when considered in conjunction with the accompanying drawings, in which:

FIGURE 1 is a block diagram arrangement, according to the invention;

FIGURE 2 is an electrical schematic diagram according to the invention;

FIGURE 3 is a curve representing the voltage-current characteristic for typical Esaki diodes such as those used in the invention;

FIGURE 4 is a curve representing the resistance-current square loop characteristic for a typical Esaki diode;

Figure 5:
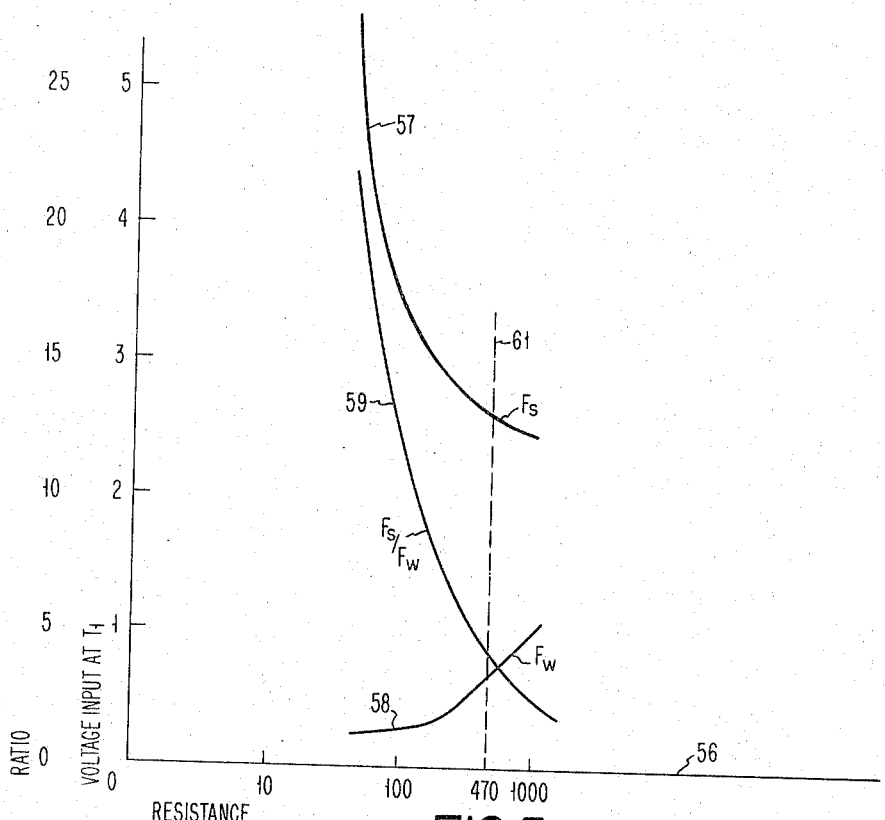
FIGURE 5 shows a resistance-voltage plot of the friction strong and friction weak signals and the relationship therebetween for various impedance values in the scaling circuit.

In general, according to the invention, there is provided a speech wave analyzing and measuring device, comprising means for transducing sibilant sounds into an electrical signal, a first register means serving to measure the zero power axis crossings of the signal, i.e., for both $F_w$ and $F_s$, and a second register means serving to measure only the zero power axis crossings of the signal for those waves thereof which exceed a predetermined amplitude, namely $F_s$ waves. There is also provided a bias supply means for each of the register means serving to provide each register means with a dynamic operating bias of a predetermined level, and preferably sufficient to insure that the active elements in the register means operate well within the saturation range. Switching means are provided responsive to the signal and connected to limit the application of the operating bias to those periods corresponding to the presence of the transduced signal so as to restrict to such periods the power drain resulting from the operating bias. Means are further provided for detecting the relationship of the output of one of the register means to the output of the other so as to provide a measure of speech competence for sibilant sounds.

The axis crossing densities of frictional sounds may be used to identify them from other sounds, such as voiced sounds. Weak frictional sounds may in turn be distinguished from strong in that they generally have a lower energy content. In distinguishing between $F_s$ and $F_w$ signals herein, tunnel diodes are employed in a novel manner so as to apply an operating bias of a predetermined level to the control electrode of each of two active circuit elements in the respective registers measuring zero axis crossings.

The performance characteristic of the Esaki diodes which is primarily exploited for this purpose is their "square loop" resistance-hysteresis characteristic whereby they may be "tripped" at different levels of input signal current to switch from a relatively low to relatively high impedance.

The mechanism whereby an Esaki diode can receive an incoming signal and emit a pulse, or not, according to the current strength of the incoming signal is illustrated by the "square loop" resistance-hysteresis curve shown in FIGURE 4. Being a highly doped PN junction semiconductor, the Esaki diode operates like a resistor having a negative resistance *slope* in the lower end of its current-voltage curve beginning at about 50 millivolts through about 300–400 millivolts. FIGURE 3 shows this negative resistance slope, *s*, in a typical Esaki diode. The practical effect of this negative slope region is to establish a "transition region" for the Esaki diode along its current-resistance curve between the two stable resistance levels or plateaus. Thus, it is called a bi-stable resistance diode.

Referring to the curve in FIGURE 4, it will be noted that the lower resistance plateau (AT) extends up to something on the order of 50 millivolts at which point (T) transition occurs, the resistance rising quickly to a number of times the former value, for example, ten. Thereafter, it assumes the higher stable resistance condition along plateau C–R and maintains this until the current drops nearly to zero (R). This square-shaped closed-loop curve (ATCR), described and shown in FIGURE 4 as representative of the change of resistance with through-put current, thus characterizes the tunnel diode as having resistance-hysteresis characteristics.

Accordingly, as employed herein, once transition has occurred and operation is begun on the upper plateau (RC) it is highly desirable to utilize the Esaki diode in a somewhat constant current device or circuit which operates safely to the right of point "R" thereby avoiding a premature return to the lower impedance state thereof. As will be more fully explained below, the Esaki diodes controlling the operating bias to registers 12, 13 for measuring $F_w$ and $F_s$ signals are disposed in an arrangement to provide such operation.

Referring to FIGURE 1, an acoustic wave is transduced by a microphone 10 and converted to an electrical input signal on line 11. Polarity reversals of the electrical signal provide positive and negative going excursions crossing the zero power axis. A first register means 12 is provided for measuring the axis crossing density of the signal on line 11. A second register means 13 is provided which serves to measure only the zero power axis crossings of the signal on line 11 for those waves of one or the other sense (i.e. positive or negative) which exceed a predetermined amplitude. Thus, a scaling means 14 precedes register 13 so as to establish a ratio of the acoustic power of the incoming signal waves that are measured by register 12 as compared with those measured by register 13.

The incoming signal on line 11 is converted to a first representation thereof which is fed to register 12 as previously generally described. The signal is also at the same time converted to a second representation thereof which is fed to register 13 via scaling means 14. In addition to controlling registers 12, 13, both the first and second signal representations also serve to provide each register means with a dynamic operating bias of a predetermined level from bias supply means 15, 16, respectively. Accordingly, switching means 17 is responsive to the incoming signal and connected to limit the application of the operating bias to periods corresponding to the presence of the transduced signal on line 11, thereby restricting to these periods the bias supply power drain associated with the operating bias. As will be noted further below, the dynamic operating bias supplied to active circuit elements found in registers 12 and 13 is sufficient to insure operation thereof well within the saturation range of each. Finally, comparing means 18 are provided for detecting the relationship of the output of one of the register means to the output of the other to provide a measure of speech competence for sibilant sounds as read from a meter or other suitable output device.

Figure 6:
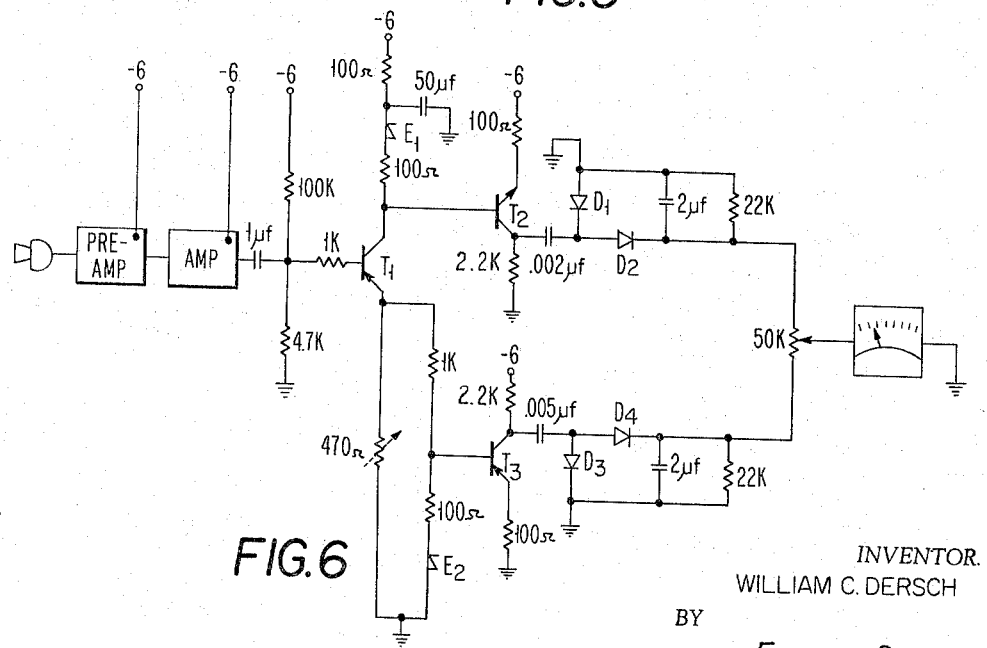
FIGURE 6 shows an actual working embodiment according to the invention with values for the various elements applied thereto.

Referring to the schematic diagram shown in FIGURE 2, an acoustic speech wave is transduced by suitable means such as microphone 10 and amplified along line 11 by conventional means such as a preamplifier 21 and amplifier 22. For example, amplifier 22 can have an output impedance on the order of eight to ten ohms with a voltage gain of approximately one hundred when used in the circuit having values as shown in FIGURE 6. The transduced signal appearing on line 11 is applied to a transistor amplifier T1 whereby whenever the incoming wave shape crosses the zero power axis, a sharply rising and falling wave shape is provided for presentation to registers 12, 13. Transistor T1 includes collector, emitter, and base connections respectively, 23, 24, and 25. Input to T1 is through a condenser 26 to a suitable biasing arrangement including a relatively large resistance element 27, as compared to a relatively small resistor 28 leading to ground. For example, where resistance element 27 has a value on the order of one hundred thousand ohms and element 28, 4.7 thousand ohms, and with the values shown in FIGURE 6, T1 draws only a very small current on the order of 0.1 milliamperes through the collector-emitter connections. As will be more fully explained below, T1 serves as an active circuit element in a novel dynamic bias arrangement for separating and converting an incoming signal on line 11 applied to base 25, into a pair of electrical representations 29, 31, thereof as they appear on collector 23 and emitter 24, respectively.

Register 12 serves to measure the axis crossing densities of all $F_s$ and $F_w$ signals, and includes an active circuit element T2 which, for example, can be an NPN transistor having emitter, base and collector connections 32, 33, and 34, respectively, where T1 is PNP. As arranged, T2 employs base 33 as a control electrode for receiving signal representation 29. Active circuit element T2 is disposed and adapted to be conditioned from a quiescent state to active operation by impressing upon base 33 a biasing potential of a predetermined level during receipt of representation 29 thereon. In the sense that an operating bias is only applied during active operation of T2, the bias is referred to herein as a dynamic bias.

Means are provided whereby application of this dynamic bias is controlled by the presence of an incoming signal on line 11 representing transduced acoustic waves. Accordingly, bias supply means are provided including a bi-stable impedance element having relatively low and high impedance states connected to respectively apply low and high bias potential to the control electrode of T2, i.e., base 33. Switching means are also provided responsive to the incoming signal on line 11 not only to switch the bistable impedance element to its high impedance state to apply the high bias to base 33, but also to transmit electrical representation 29 thereto.

This bias supply means includes, in a series circuit, a source of potential represented by the (—)6 volt supply 35 and an Esaki diode E1 which, as explained above, is characterized by exhibiting a change of state from low impedance to high impedance when a predetermined level of current flows through same. This change of resistance state is extremely rapid and, since the tunnel diode has a relatively square loop resistance-current hysteresis characteristic, once it changes state it will stay in the changed condition until the driving current is reduced to approximately .2 milliampere. In the arrangement as shown, diode E1 will switch to its high impedance state when a current on the order of a milliampere flows through same. The series circuit further includes a resistance element 36 coupled to collector 23 so as to form a junction point 37 therebetween. Base 33 of T2 is coupled to junction point 37 to receive the electrical representations 29 therefrom, as well as to receive the dynamic bias applied via Esaki diode E1 and resistance element 36. Further, in accordance with generally accepted engineering practice, a decoupling capacitor 38, connected to ground and a resistance element 39 are provided in order to keep sharp noise out of the bias lines.

Tunnel diode E1 and transistor T2, preferably have a "forming" voltage characteristic matched one to the other as would be provided, for example, by using a germanium tunnel diode and germanium transistor. This forming voltage can be on the order of around 300 millivolts. Therefore, the threshold for saturation operation of T2 is approached at the same time as the threshold of high impedance operation of E1. To insure operation of T2 well into saturation during high impedance operation of E1, T2 should be biased somewhat in that direction. However, to provide this bias by conventional means produces an objectionable additional power drain on the power supply (batteries) and adds to circuit complexity. Thus, provision of resistance element 36 serves to supply a sufficient level of potential on base 33 whereby T2 is operated well into saturation but power drain is virtually limited to periods of active operation of T2.

In operation, as an incoming negative going signal appears on base 25 of T1, a positive going signal representing same appears on collector 23. As the amplitude of the signal increases, current in collector 23 will increase to approximately one milliampere, i.e., the switching threshold of E1. When the transition current through E1 rises sufficiently to switch E1 so as to implement its high impedance characteristic, the potential on base 33 sharply rises to a value on the order of 0.5 volt with respect to emitter 32. By selecting resistance element 36 sufficiently large, e.g. 100 ohms, as shown in the actual embodiment in FIGURE 6, the potential at junction point 37 is sufficiently increased so as to insure saturation operation of T2.

Means for measuring all the zero axis crossings of an incoming signal on line 11 are provided in register means 12. The measuring means includes a so-called "bucket and well" integrating circuit whereby a unit charge is stored on condenser 41 during negative excursions of representation 29 and, during positive excursions, is discharged into a larger condenser 43.

Thus when T2 conducts in response to representation 29 applied at base 33, a unit charge is applied to condenser 41 via diode D1. As the sense of representation 29 reverses, condenser 41 discharges via diode D2 into the larger condenser 43. The time constant, or discharge time of condenser 43 is adjusted by resistor 44 so as to substantially correspond to a syllabic speech interval.

A similar "bucket and well" integrating circuit is incorporated in register 13 for measuring the number of zero axis crossings for those waves exceeding a predetermined amplitude. Register 13 is arranged similarly to that of register 12 with the exception that transistor T3 is of opposite conductivity type, and that condenser 51 has approximately two and one-half times the capacity of condenser 41. Thus, for a given number of switchings, the voltage build-up on condenser 53 is two and one-half times that on condenser 43 for an equal number of switchings. The polarity of the voltage build-up at point X is opposite to that at point Y–V. Thus, a potentiometer 55 compares the voltage across these two summing capacitors 43, 53 so as to provide a measure of speech competence for sibilant sounds on meter 19. Tunnel diodes E1 and E2 preferably have matched characteristics. Therefore, to switch one in response to strong frictioning ($F_s$) sounds only, scaling means are provided to require an excursion of the representation 31 to attain a greater amplitude to switch E2, than the corresponding amplitude of representation 29 which switches E1.

Means for scaling representation 31 so as to detect those waves of the transduced signal on line 11 which exceed a predetermined amplitude are provided in the emitter circuit of T1 ahead of T3.

Means are further provided, responsive to representations of those waves exceeding a predetermined amplitude and which are to be measured, serving to apply a high bias to the base of the control electrode of register 13 so as to transmit the detected high amplitude electrical representations thereto. Thus the high operating bias is applied to the active circuit element, T3, in register 13 only during the presence of such a representation 62 of the high amplitude signals on the base 65 of T3, so as to detect strong frictional sounds from weak, and measure only the former.

As shown in FIGURE 2, and FIGURE 6, the foregoing arrangement for scaling and measuring "$F_s$ only" includes a parallel circuit including two branches A, B. Branches A and B are connected between emitter 24 and a reference potential, for example, ground. Branch A of the parallel circuit includes, in series leading from the ground reference potential, a tunnel diode E2, a first impedance element 45 and a second impedance element 46. A junction point 47 is formed between elements 46 and 45 and is operatively coupled to the base 65 of transistor T3. Where impedance element 45, such as the resistor shown in FIGURE 6, having one hundred ohms is employed, it serves to provide a sufficient bias potential at junction point 47 to insure operation of transistor T3 well into the range of saturation thereof. The second impedance element 46 in the form of a resistor of a relatively high value serves to maintain, after switching of the tunnel diode E2 to its high impedance state, a sufficient potential across E2 with respect to ground potential to maintain the high impedance state of E2 until substantially the next axis crossing of the signal is received at the emitter 24 of T1.

The other branch B includes a shunt impedance in the form of a resistance element 49 sufficiently large with respect to the overall impedance of branch A (as shown in FIGURE 6) to maintain the current through the emitter relatively constant immediately before and after switching of Esaki E2. Thus the percentage change in current via the emitter remains relatively constant substantially throughout the negative going excursions of representation 31 (where T1 is PNP). Impedance element 49 can be a variable resistor as shown whereby it can be adjusted to control the relationship of when switching will occur in E1 as respects the time of switching of E2.

Referring to FIGURE 5, it can be seen that by varying resistance of element 49 along the abscissa 56, which represents resistance in ohms of element 49, the voltage necessary to switch E2 varies as curve 57 while the voltage necessary to switch E1 progresses along curve 58. The ratio between curves 57, 58 follows the curve 59. Dashed line 61 shows the ordinate of these curves when resistance element 49 has a value according to that shown in FIGURE 6. From inspection of the curves in FIGURE 5, it can be seen that a scaling ratio of approximately five to one is established in this manner. A preferred suggested range of values for the ratio between curves 57, 58 lies on the order of between three and six.

Thus, the emitter and collector circuits of T1 as disposed between the minus six volt supply and ground constitute something of a voltage divider network wherein operation of T2 is controlled at one point therealong and T3 at another.

In operation, if it is assumed that an incoming signal is received on base 25 of T1 and it comprises a weak friction sound, such as "th," as the incoming signal goes negative, current will commence building up at junction point 37 until E1 switches (at around .001 ampere, for example). When E1 switches, a sufficient potential is applied to bias the base 33 into saturation and the zero axis density is measured by the "bucket and well" integrating circuit of register 12. With weak frictional sounds, the voltage at junction point 48 is insufficient to draw a switching level of "transition current" through E2 due to the presence of parallel branch B. However, whenever a strong frictional sound ("s") is introduced on base 25 so that the negative going signal at the emitter has an amplitude raising the voltage at junction point 48 sufficiently to provide a switching current in E2, upon such switching of E2 to its high impedance state a biasing potential is applied at junction point 47 to the base of T3 so as to insure saturation operation of same. The relatively large value of resistance for element 46 serves to insure a sufficient potential between the (−6) supply and junction point 47 so as to continue to draw a current through E2 which maintains it safely to the right of point R in FIGURE 4. However, when the excursion of signal representations 31 change polarity, diode E2 will be again switched to its low impedance state and await receipt of the next subsequent high amplitude input signal.

Thus, inasmuch as the current at junction point 37 is substantially constant immediately before and after switching and the resistance of element 49 is sufficiently great with respect to that in branch A so as to maintain a relatively stable voltage at junction point 48, signal distortion and other undesirable effects are precluded elsewhere in the circuit.

If a child pronounces his "s" properly, the voltage at point X indicates that he is pronouncing the sound more like an "s" sound whereas if he pronounces it improperly as a "th" the center-tap resistor 55 will compare the voltages between X and Y to indicate the relationship between the proper pronounciation and what was actually pronounced. Thus the degree of displacement of the meter, determined by the summing capacitor voltages of opposite polarity with respect to center-tap 55, is a visual output indication of a properly pronounced sibilant sound.

In FIGURE 6 the values of the resistance elements are in ohms unless followed by the letter K which is used to resent the number of ohms measured in thousands. Diodes E1, E2 are identified as type No. 1N3712, and diodes D1–D4 are each identified as 1N456. Transistors T1 and T3 are 2N1307 and T2 is 2N1306.

From the foregoing it will be evident that the dynamic operation of the applied bias to T2 and T3 effects a power drain on the bias supply only during the presence of an incoming signal. Furthermore, it will be evident that the emitter circuit permits a low voltage power supply to be utilized without sacrifice to a relatively large scaling of the incoming signal.

I claim:

1. In a speech wave analyzing and measuring device having means for transducing sibilant sounds into an electrical signal, apparatus comprising first register means serving to measure the zero power axis crossings of said signal, second register means serving to measure only the zero power axis crossings of said signal for waves thereof exceeding a predetermined amplitude, bias supply means for each of said register means serving to provide each said register means with a dynamic operating bias of a predetermined level, and switching means responsive to said signal and connected to limit the application of said operating bias to periods corresponding to the presence of said signal thereby restricting the bias supply power drain associated with said operating bias to such periods.

2. Apparatus as defined in claim 1 wherein said first and second register means include active circuit elements in each respectively, and said predetermined level is sufficient to insure operation of said active circuit elements well within the saturation range of each.

3. Apparatus as defined in claim 1 further including means for detecting the ratio of the output of one of said register means to the output of the other of said register means to provide a measure of speech competence for sibiliant sounds.

4. In apparatus of the kind described having an active circuit element for registering the crossings of a predetermined power axis by an electrical signal, said active circuit element being disposed and adapted to be conditioned from a quiescent state to active operation, said active circuit element including a control electrode disposed and adapted, in active operation, to receive a biasing potential thereon of a predetermined level, bias supply means for biasing said electrode to said predetermined level during active operation, said bias supply means including a bi-stable impedance element having relatively low and high impedance states connected to respectively apply low and high bias potential to said control electrode, and switching means responsive to said signal to switch said impedance element to its high impedance state to apply said high bias potential to said electrode and further connected to transmit an electrical representation of said signal to said control electrode to operate same during said high bias condition to apply said high bias only during the presence of said signal, thereby minimizing the power drain on said bias supply means.

5. Apparatus as defined in claim 4 further including a predetermined impedance element series connected to said bi-stable element and disposed to further increase the high bias to said electrode to insure saturation operation of said active circuit element.

6. Apparatus as defined in claim 5 wherein said bias supply means includes, in series, a source of potential, said bi-stable element, and the last named impedance element, the last named element being operatively coupled to said switching means to form a junction point therebetween, said control electrode being coupled to said junction point to receive said electrical representation and said bias therefrom.

7. Apparatus as defined in claim 6 wherein said bi-stable element and said active circuit element are respectively semiconductive devices, the forming voltage characteristic of one being substantially matched to the forming voltage characteristic of the other.

8. Apparatus of the kind described comprising an active circuit element for registering the crossings of a predetermined power axis by an electrical signal, said active circuit element including a first transistor including emitter, collector, and base connections, said base connection being connected to receive a biasing potential of a predetermined level and electrical representations of said signal, said biasing potential being applied thereto only during receipt of said representations, bias supply means responsive to said signal serving to bias said base to said level, said bias supply means including a bi-stable current-responsive impedance element switchable between relatively low and high impedance states and connected to respectively low and high bias potential to said base connection, and a second transistor including emitter, collector and base connections, the base connection of said second transistor serving to receive said signal and provide an electrical representation thereof on the collector of said second transistor, the last named collector being operatively coupled to switch said impedance element to its high impedance state to apply said high bias potential to the base of the first transistor and to transmit said electrical representation to the last named base thereby applying said high bias only during the presence of said representation on the collector of said second transistor.

9. Apparatus as defined in claim 8 wherein said bias supply means comprises, in series, a source of potential, a tunnel diode and a resistor, said resistor being connected to the collector of said second transistor to form a junction point therewith, and the base of said first transistor being operatively coupled to said junction point, the resistor having a sufficient value to insure operation of said first transistor well into the saturation range of same.

10. Apparatus as defined in claim 9 wherein said tunnel diode and said first transistor include a forming voltage characteristic substantially matched one to the other.

11. Apparatus of the kind described comprising a circuit for registering zero power axis crossings of an electrical signal, a first transistor disposed in said circuit and including emitter, collector and base connections, said base connection being connected to receive a biasing potential of a predetermined level and electrical representations of said signal, said biasing potential being applied thereto only during receipt of said representation, bias supply means for biasing said base to said level responsive to said signal, said bias supply means including a bi-stable current-responsive impedance element switchable between relatively low and high impedance states connected to respectively apply low and high bias potential to said base connection, a second transistor having base, collector and emitter connections, the base connection being connected to receive said signal and provide an electrical representation thereof at the emitter of the second transistor, the last said emitter being operatively coupled to said bi-stable impedance element to switch same to the high impedance state thereof responsive to said representations to apply said high bias to the base of the first transistor and to transmit said electrical representation to the last named base thereby applying said high bias only during the presence of said representation on the emitter of the second transistor.

12. Apparatus as defined in claim 11 wherein said bias supply means comprises a parallel circuit, including two branches, connected between the emitter of the second transistor and a reference potential, one branch of said parallel circuit including, in series leading from said reference potential, a tunnel diode, a first impedance element, and a second impedance element, a junction point formed between said first and second impedance elements and operatively coupled to the base of said first transistor, said first impedance element having a sufficient value to insure operation of said first transistor well into the range of saturation of same, said second impedance element serving to maintain, after switching of said bi-stable element to the high impedance state thereof, sufficient potential across said bi-stable element with respect to said reference potential to maintain said high impedance state substantially until the next zero power axis crossing of said signal, the other branch of said parallel circuit including a shunt impedance sufficiently large with respect to the impedance of the first named branch to maintain the current via the emitter relatively constant immediately before and after switching of said bi-stable element.

13. In a speech wave analyzing device, apparatus including means for transducing sibilant sounds into an electrical signal having positive and negative excursions, a semiconductive device including emitter, collector, and base connections, said base being operatively connected to receive said signal and provide an electrical representation of same at both said collector and emitter, first register means serving to measure the zero power axis crossings of said signal, said first register means including an active circuit element for generating a pulse for each said crossing, said active circuit element including a control electrode, second register means serving to measure only the crossings of said signal for excursions thereof exceeding a predetermined amplitude, said second register means including an active circuit element for generating a pulse for each zero power axis crossing to be measured by said second register means, the last named active circuit element having a control electrode, the first and last named control electrodes being operatively coupled to receive respectively, the representations from said collector and emitter connections to operate said first and second register means in response thereto, and a voltage dividing network for independently biasing each said control electrode to a predetermined level responsive to, and during receipt of, said representations, said voltage dividing network including a source of bias supply potential, a first switchable impedance element operatively coupled to said bias supply, the last named element being switchable between relatively low and high stable impedance states, a series connected impedance means, the last named impedance means being further coupled in series with said collector to include a first junction point therebetween, said first junction point being operatively coupled to the control electrode of the first named active circuit element, the value of said last named impedance means being sufficient to apply a bias potential insuring operation of said first named active circuit element well into the saturation range of operation of same, said voltage divider network further including said emitter and a parallel circuit, including two branches, connected between said emitter and a reference potential, one branch of said parallel circuit including, in series between said reference potential and said emitter, a second switchable impedance element switchable between relatively low and high stable impedance states, a first impedance means and a second impedance means, a second junction point between said first and second impedance means operatively coupled to the control electrode of the second named active circuit element, the value of said first impedance means being sufficient to apply a bias insuring operation of the last named active circuit element well into the saturation range of operation of same, said second impedance means serving, after switching said second switchable impedance element to the high impedance state thereof, to maintain sufficient potential across said bistable element to maintain said high impedance state substantially until the next subsequent zero power axis crossing of said signal, the other branch of said parallel circuit including a shunt impedance serving to establish a ratio of amplitudes of said signal representations at which said first and second switchable elements, respectively, switch to their high impedance states.

14. In a speech wave analyzing device, apparatus including means for transducing sibiliant sounds into an electrical signal having positive and negative excursions, a semiconductive device including emitter, collector, and base connections, said base being operatively connected to receive said signal and provide an electrical representation of same at both said collector and emitter, first register means serving to measure the zero power axis crossings of said signal, said first register means including an active circuit element for generating a pulse for each said crossing, said active circuit element including a control electrode, second register means serving to measure only the crossings of said signal for excursions thereof exceeding a predetermined amplitude, said second register means including an active circuit element for generating a pulse for each zero power axis crossing to be measured by said second register means, the last named active circuit element having a control electrode, the first and last named control electrodes being operatively coupled to receive respectively, the representations from said collector and emitter connections to operate said first and second register means in response thereto, and a voltage dividing network for independently biasing each said control electrode to a predetermined level responsive to, and during receipt of, said representations, said voltage dividing network including a source of bias supply potential, a first switchable impedance element operatively coupled to said bias supply, the last named element being switchable between relatively low and high stable impedance states, a series connected impedance means, the last named impedance means being further coupled in series with said collector to include a first junction point therebetween, said first junction point being operatively coupled to the control electrode of the first named active circuit element, the value of said last named impedance means being sufficient to apply a bias potential insuring operation of said first named active circuit element well into the saturation range of operation of same, said voltage divider network further including said emitter and a parallel circuit, including two branches, connected between said emitter and a reference potential, one branch of said parallel circuit including, in series between said reference potential and said emitter, a second switchable impedance element switchable between relatively low and high stable impedance states, a first impedance means and a second impedance means, a second junction point between said first and second impedance means operatively coupled to the control electrode of the second named active circuit element, the value of said first impedance means being sufficient to apply a bias insuring operation of the last named active circuit element well into the saturation range of operation of same, said second impedance means serving, after switching said second switchable impedance element to the high impedance state thereof, to maintain sufficient potential across said bi-stable element to maintain said high impedance state substantially until the next subsequent zero power axis crossing of said signal, the other branch of said parallel circuit including a shunt impedance sufficiently large with respect to the impedance of the first named branch to maintain the percentage change throughout those excursions of said signal having a predetermined polarity sense.

15. Apparatus according to claim 1 further including means responsive to both said register means for detecting the relationship of a value in one to a value in the other to provide a measure of speech competence for sibilant sounds.

16. Apparatus according to claim 15 wherein the last named means compares a first time averaged signal representative of said transduced signal, and a second time averaged signal representative of said signal to provide a measure of speech competence for sibilant sounds, said first and second representations being of opposite polarity sense with respect to a predetermined potential level, and means for visually indicating said comparison.

No references cited.

KATHLEEN H. CLAFFY, *Primary Examiner.*

R. MURRAY, *Assistant Examiner.*